Oct. 27, 1925.

Re. 16,192

A. WATHEY

STOKER CYLINDER

Original Filed June 3, 1922 2 Sheets-Sheet 1

Inventor

Arthur Wathey.

By Dwight B. Sam.

Attorney

Oct. 27, 1925.

Re. 16,192

A. WATHEY

STOKER CYLINDER

Original Filed June 3, 1922 2 Sheets-Sheet 2

Inventor

Arthur Wathey,

By Dwight B. Sun

Attorney

Reissued Oct. 27, 1925. Re. 16,192

UNITED STATES PATENT OFFICE.

ARTHUR WATHEY, OF CLEVELAND, OHIO.

STOKER CYLINDER.

Original No. 1,500,972, dated July 8, 1924, Serial No. 565,638, filed June 3, 1922. Application for reissue filed February 4, 1925. Serial No. 6,905.

*To all whom it may concern:*

Be it known that I, ARTHUR WATHEY, a citizen of the United States, residing at Cleveland, county of Cuyahoga, State of Ohio, have invented certain new and useful Improvements in Stoker Cylinders, of which the following is a specification.

This invention relates to mechanical stokers for boiler furnaces, and has for its object to provide an improved form of cylinder for such stokers.

The cylinders, through which the rams or pushers work for feeding fuel into the furnace, have heretofore been made of solid or integral castings, and when holes are worn through the bottoms thereof, which is bound to occur after a certain period of use, it has been necessary to take down the worn retorts and replace them with new ones at considerable expense. Not only does the cost of the new complete cylinders and the time of workmen involve a great outlay of money, but the furnace must be put out of use for a considerable length of time while the repairs are being made.

It is an aim of the present invention to provide a cylinder for stokers which does not have to be entirely replaced when its bottom wears out, so that much of the expense and time required heretofore for making repairs is saved and the main portion of cylinder utilized for a much longer period than before.

Another object of the invention is to provide means in connection with a stoker cylinder whereby when the ram operating therein becomes inoperative, defective or worn, the same may be readily removed from the cylinder and replaced by a repaired or new ram without necessitating the detachment of the cylinder or its associated parts from the furnace, or without taking down or dismembering the ram operating mechanism.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

The cylinder 1 is preferably made in accordance with the present practice, except that instead of having a solid or integral bottom, the bottom 2 is here made as a separable casting which may be readily applied to or removed from the cylinder when required, and which is capable of minute adjustment toward and away from the said cylinder. The cylinder on its upper side and near one end is provided with a hopper 3, through which fuel is fed to the cylinder, and a ram or pusher (not shown) slides longitudinally within the cylinder to force the fuel from beneath the hopper into the furnace (not shown), as will be understood.

Figure 1:
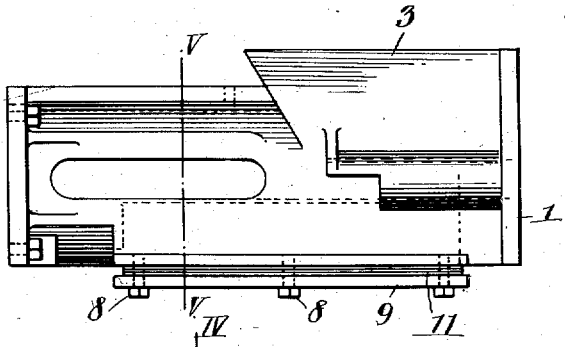
Figure 1 is a side elevation of a cylinder constructed substantially in accordance with the present invention.
Figure 2:
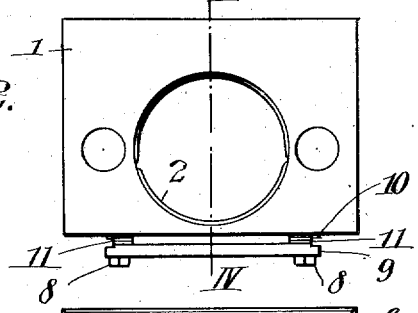
Figure 2 is a front end elevation of the same.
Figure 3:
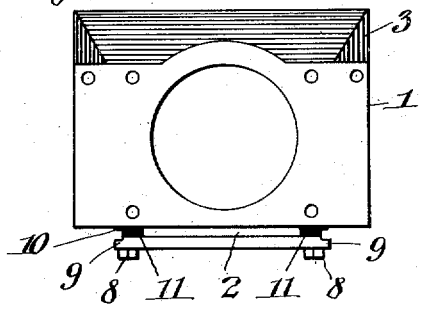
Figure 3 is a rear end elevation of the cylinder.
Figure 4:
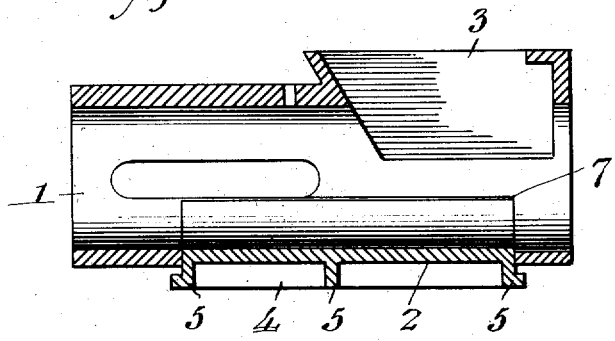
Figure 4 is a longitudinal vertical section on the line 4—4 of Figure 2.
Figure 5:
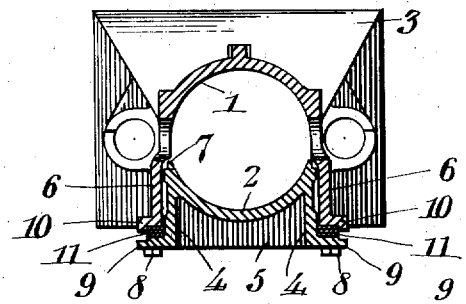
Figure 5 is a transverse vertical section on the line 5—5 of Figure 1 looking towards the right.
Figure 6:
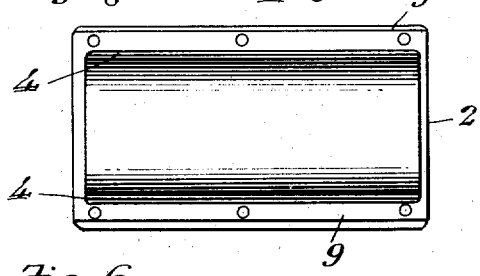
Figure 6 is a detailed plan view of the removable bottom for the cylinder.

The adjustable and removable bottom 2 may extend substantially throughout the path of the ram or pusher, and as shown best in Figure 4, need not constitute the entire bottom of the cylinder. Said bottom 2 is preferably formed of chilled steel, at least its upper ram engaging surface is chilled, in order to render the same more durable. Said upper surface is channeled to conform to the contour of the interior of the cylinder, and preferably has longitudinal side members 4 and transverse truss members 5, said side members fitting between corresponding side members 6 extending along the margins of the opening 7 in the bottom of the cylinder in which said removable bottom 2 is arranged, Figure 5.

The bottom 2 is held in place by bolts 8 engaging outwardly extending flanges 9 and 10 respectively on the side members 4 and 6. Between said flanges a plurality of shims or liners 11, preferably one-eighth of an inch in thickness, are placed in order that as the upper surface of the bottom 2 wears down said shims or liners may be removed one at a time to compensate for said wear.

When the last of the shims or liners has been removed on each side and the bottom wears entirely through, it may be quickly taken out through the opening 7 in the cylinder upon removing the bolts 8 without moving the main upper section of the cylinder, or disturbing the boiler front, coal chute or any other part of the stoker. Whereas it takes about a week to remove six retorts or cylinders and replace them with entirely new ones according to the old practice, the bottoms may be renewed when the present invention is used in about three hours. It will thus be seen that this invention means a great saving in time and expense and does away with the necessity of interrupting the use of boilers for long periods for repairs to the stoker cylinders.

It frequently happens that the ram, through continued operation, becomes worn, which wear detracts from its effectiveness. This may be compensated for by adjustment of the bottom casting 2, as the latter, by proper manipulation of its adjusting means can be moved bodily a proper degree to insure accurate fitting of the cylinder to the worn ram. Should the latter become broken or worn to such degree as to be incapable of further use, it may be bodily removed from the cylinder after detaching the bottom member 2. In carrying out this operation, it is only necessary to disconnect the ram from its operating means and withdraw it through the opening 7. The latter opening will be made sufficiently large to permit of the ready withdrawal of the ram through the same and the introduction of a new or repaired ram.

I claim:—

1. The combination in a stoker cylinder, of a detachable bottom member approximately semi-circular in cross-section adapted to rigidly support the weight of a ram in said cylinder and means for adjusting said bottom member transversely of the cylinder for the purpose specified.

2. The combination in a stoker cylinder, of a detachable bottom member approximately semi-circular in cross-section adapted to rigidly support the weight of a ram in said cylinder, and means for adjusting said bottom member transversely of the cylinder, the upper surface of said bottom member being chilled for the purpose specified.

3. The combination in a stoker cylinder, of a detachable bottom member approximately semi-circular in cross-section adapted to rigidly support the weight of a ram in said cylinder, depending flanges on the bottom member and adjacent portions of the cylinder, and means for adjusting the flanges on the bottom member with respect to the flanges on said adjacent portions for the purpose specified.

4. The combination in a stoker cylinder having an opening in its base, of a bottom member removably fitted in said opening, depending flanges at the edges of said opening in the cylinder and at the edges of the bottom member, horizontal flanges at the bases of said depending flanges, means for fastening said bottom member in place, and shims interposed between said horizontal flanges for the purpose specified.

5. The combination in a stoker cylinder having an opening in its base through which a ram may be inserted or removed, of a detachable bottom member removably fitted in said opening and adapted to rigidly support the weight of a ram in said cylinder, and means for adjusting said bottom member transversely of the cylinder for the purpose specified.

In testimony whereof I hereby affix my signature.

ARTHUR WATHEY.